United States Patent [19]

Baker et al.

[11] 3,937,127
[45] Feb. 10, 1976

[54] HYDRAULIC BRAKE BOOSTER WITH SHUT-OFF MEANS
[75] Inventors: James P. Baker, Portland, Oreg.; Richard J. Silagy, Parma, Ohio
[73] Assignee: The Weatherhead Company, Cleveland, Ohio
[22] Filed: Feb. 1, 1974
[21] Appl. No.: 438,624

[52] U.S. Cl. .................. 91/372; 60/553; 91/433; 91/454; 137/627.5
[51] Int. Cl.[2] ................................ F15B 9/10
[58] Field of Search ............ 91/370, 371, 372, 373, 91/376, 377, 433, 454; 137/627.5; 60/553, 554, 556, 404

[56] References Cited
UNITED STATES PATENTS

| | | | |
|---|---|---|---|
| 2,902,829 | 9/1959 | Verbrugge | 91/376 X |
| 3,354,788 | 11/1967 | Garrison et al. | 91/373 |
| 3,532,027 | 10/1970 | MacDuff et al. | 91/371 |
| 3,583,422 | 6/1971 | Dach et al. | 91/433 X |
| 3,628,423 | 12/1971 | Dymond | 91/376 |
| 3,677,138 | 7/1972 | Goscenski | 91/373 |
| 3,730,226 | 5/1973 | Nelson | 137/627.5 |
| 3,733,966 | 5/1973 | Brown, Jr. | 91/372 |
| 3,747,473 | 7/1973 | Bach et al. | 91/373 |
| 3,770,019 | 11/1973 | Stelzer | 137/627.5 |
| 3,834,162 | 9/1974 | Keady | 60/418 |
| 3,841,095 | 10/1974 | Baker | 60/404 |

*Primary Examiner*—Martin P. Schwadron
*Assistant Examiner*—Abraham Hershkovitz
*Attorney, Agent, or Firm*—McNenny, Farrington, Pearne & Gordon

[57] ABSTRACT

A motor vehicle fluid power circuit is disclosed in which a pump driven by the engine of the vehicle assists the operator in braking the vehicle and in steering the vehicle. The circuit includes a pump, a brake booster, and a steering valve. A valve spool throttles fluid flow from the pump to the steering valve to maintain the outlet pressure of the pump at least a predetermined pressure differential above the working pressure of the brake booster. The brake booster includes a shut-off means which hydraulically isolates the pressure side of the pump from the brake booster when the brake booster reaches a predetermined shut-off pressure which is less than the relief pressure of the pump relief valve so that operation of the brake booster cannot actuate the relief valve of the pump.

10 Claims, 2 Drawing Figures

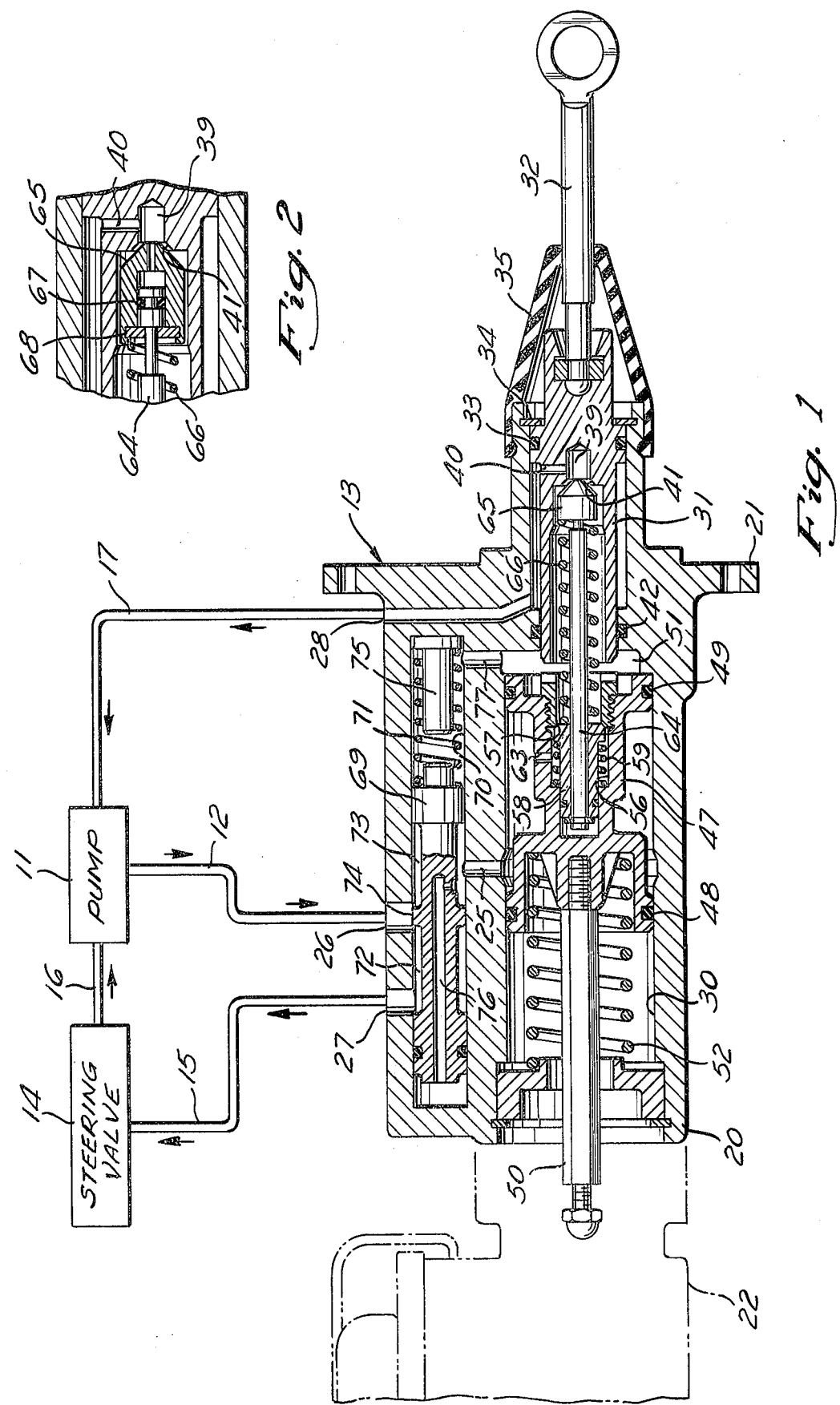

HYDRAULIC BRAKE BOOSTER WITH SHUT-OFF MEANS

CROSS REFERENCE TO RELATED APPLICATIONS

Reference is made to the copending U.S. Pat. application of James P. Baker, Ser. No. 379,319, filed July 16, 1973 and assigned to the assignee of this application, and to the copending U.S. Pat. application, now U.S. Pat. No. 3,898,809 of James P. Baker, Ser. No. 419,999, filed Nov. 29, 1973, both of which are assigned to the assignee of this application and both of which are incorporated in this application by reference as though fully reprinted herein.

Reference is also made to the copending U.S. Pat. application, now U.S. Pat. No. 3,834,162 of Frederick D. Keady, Ser. No. 353,248, filed Apr. 23, 1973 assigned to the assignee of this application.

BACKGROUND OF THE INVENTION

This invention relates generally to a hydraulic fluid power circuit, and more particularly to a motor vehicle hydraulic fluid power circuit having a hydraulic pump for supplying fluid to assist the operator in steering and breaking the vehicle.

Motor vehicles are frequently provided with a hydraulic pump which is driven by the engine of the vehicle to provide a source of fluid power. In passenger cars, this fluid power is frequently used to assist the operator in steering the vehicle. Because of increasing automobile braking performance requirements and because of a decreasing ability of intake manifold vacuum braking systems to provide that performance, it has been suggested to use the fluid power of the engine driven hydraulic pump to assist the operator in braking the vehicle, as well as to assist the operator in steering the vehicle.

The hydraulic pumps which are used in such systems include a relief valve which is generally internal and which connects the outlet of the pump to the inlet of the pump at a relief pressure to prevent excessive pressures in the system. If the working pressure of the brake booster reaches or exceeds the relief pressure of the pump relief valve, the pump relief valve will be actuated and the output flow from the pump will thereby be decreased to substantially zero. This terminates flow of fluid to the steering valve with the undesirable result of terminating the power steering assist for the operator until the brake booster working pressure decreases to a pressure below the relief pressure of the pump relief valve.

To limit the working pressure of the brake booster to a pressure less than the relief pressure of the pump relief valve in order to prevent this from happening, it is disclosed in the above referenced U.S. Pat. applications, Ser. Nos. 379,319 and 419,999 of James P. Baker that the brake booster power chamber can be connected to drain to prevent the working pressure of the brake booster from reaching or exceeding the pump relief pressure. Although the structure disclosed in these two United States patent applications overcomes the problem of the brake booster working pressure exceeding the pump relief pressure and thereby terminating flow to the steering valve, this structure has the disadvantage that some of the output of the pump is wasted because it is connected back to the drain line through the brake booster.

SUMMARY OF THE INVENTION

The present invention provides a fluid power circuit for a motor vehicle for assisting the operator in steering and braking the vehicle. The brake booster power chamber is hydraulically isolated from the pump when the pressure in the power chamber reaches a predetermined shut-off pressure which is less than the pump relief pressure, so that operation of the brake booster cannot actuate the pump relief valve to terminate flow of fluid to the steering valve.

More specifically, the present invention provides a motor vehicle fluid power circuit which includes a pump driven by the engine of the vehicle, a steering valve, and a brake booster. The pump has an inlet, an outlet, and a relief valve for hydraulically connecting the pump inlet to the pump outlet at a relief pressure. The brake booster has a power chamber, and the pump outlet is hydraulically connected to both the steering valve and the power chamber. Shut-off means hydraulically isolates the pump outlet from the power chamber when the fluid pressure in the power chamber reaches the predetermined shut-off pressure, which is less than the pump relief pressure. This prevents further flow of fluid from the pump to the brake booster so that the entire output of the pump is available to the steering valve when the power chamber pressure reaches the shut-off pressure.

Still more specifically, the brake booster includes first valve means for opening and closing fluid pressure communication between the fluid power chamber and the pump inlet and second valve means for opening and closing fluid pressure communication between the fluid power chamber and the pump outlet. The shut-off means includes a rod mechanically connecting the first and second valve means, and the rod has one end exposed to pressure in the power chamber so that the rod closes the second valve means when the fluid pressure in the power chamber reaches the predetermined shut-off pressure.

BRIEF DESCRIPTION OF THE DRAWINGS

These and other aspects and advantages of the present invention are incorporated in the preferred embodiment of the invention shown in the drawings wherein:

FIG. 1 is a schematic circuit diagram of a motor vehicle fluid power circuit according to the principles of the invention, with the brake booster shown in cross-section; and FIG. 2 is an enlarged cross-sectional view of a portion of the brake booster shown in FIG. 1.

DETAILED DESCRIPTION OF THE DRAWINGS

A. Structure

Referring now to the drawings in greater detail, the circuit shown in FIG. 1 includes a hydraulic pump 11 providing a source of fluid power for the circuit. The pump 11 is driven by the engine of the motor vehicle (not shown), and in the preferred embodiment the pump 11 is a constant displacement pump having an output of 2.5 gallons per minute and is of the type commonly used in motor vehicle power steering systems at the present time. The pump 11, in a well known manner, includes an internal relief valve which connects the outlet of the pump to the inlet of the pump when a predetermined maximum pressure is reached to prevent damage to the pump or to the remainder of the circuit. In the embodiment shown in FIG. 1, the internal relief pressure of the pump 11 is set at 1200 p.s.i.

A suitable line 12 carries the entire output of the pump 11 to a brake booster 13. The brake booster 13, as discussed in detail below uses no fluid whatsoever from the pump 11 except during brake actuation movement. Fluid from the pump 11 which is not used by the brake booster 13 flows to a steering valve 14 through a line 15. Drain lines 16 and 17 provide a return flow path to the pump 11 from the steering valve 14 and brake booster 13, respectively.

The steering valve 14 is of the type conventionally used in automobiles at the present time. The steering valve 14 directs the fluid which it receives back to the pump 11 through drain line 16 when the steering valve is in its neutral or center position. When fluid from the pump 11 is required to assist in the steering of the vehicle and the steering valve 14 is displaced from its center position, the steering valve 14 directs at least some of the fluid received through the line 15 to a fluid motor (not shown) of the motor vehicle power steering system in a well known manner.

The brake booster 13 includes a generally cylindrical axially extending housing 20. An annular mounting flange 21 is provided on the right end of the housing 20 for securing the brake booster 13 to a firewall (not shown) of the motor vehicle. The brake booster 13 is interposed between a foot-operated brake pedal (not shown) of the motor vehicle and a master cylinder 22 of the motor vehicle to assist the operator in the application of the brakes in a manner discussed in detail below.

The housing 20 includes an inlet port or pump port 26 which is hydraulically connected to the line 12 to receive the entire output of the pump 11 under all conditions. A first outlet port or steering valve port 27 is hydraulically connected to the line 15 to supply the fluid from the pump 11 which is not used by the brake booster 13 to the steering valve 14. As described in greater detail below, the brake booster 13 allows the entire output of the pump 11 to be supplied to the steering valve 14 except during brake actuation movement of the brake booster 13. A second outlet port or drain port 28 is hydraulically connected to the line 17 to return the fluid which is used by the brake booster 13 during brake actuation movement to the inlet of the pump 11 upon brake release. A power chamber port 25 leads to the power chamber of the brake booster 13 as described below. As shown in FIG. 1, the pump port 26 is disposed between the steering valve port 27 and the power chamber port 25.

As further shown in FIG. 1, a bore 30 extends axially through the housing 20. An input rod 31 is slidably disposed in the right end of the bore 30, and a connecting rod 32 is secured to the input rod 31 by a suitable retaining ring to connect the brake pedal (not shown) to the input rod 31. A seal 33 prevents fluid leakage between the input rod 31 and the right end of the bore 30, and a snap ring 34 prevents the input rod 31 from being pulled out of the right end of the bore 30. A suitable dust cap 35 is also provided to prevent dust or other contaminants from entering the right end of the bore 30.

An axially extending outlet passage 39 extends from one end of the input rod 31, and a radial passage 40 establishes open fluid pressure communication between the outlet passage 39 and the outlet port 28. An annular end portion 41 of the input rod 31 surrounds the passage 39 and provides an annular valve seat as described in greater detail below. A suitable seal 42 prevents fluid leakage between the bore 30 and the left end of the input rod 31.

A power piston 47 is also slidably disposed in the bore 30. A first seal 48 and a second seal 49 prevent fluid leakage between the power piston 47 and the bore 30. An output rod 50 is secured to the left end of the power piston 47 for exerting a force on the master cylinder 22 to which the brake booster 13 is connected. In the embodiment shown in FIG. 1, the output rod 50 is shown schematically as a separate piece from the power piston 47, but the output rod 50 could alternatively be made as a single piece with the power piston 47. The right end of the power piston 47 cooperates with the bore 30 to define a power chamber 51. A return spring 52 urges the power piston 51 to the right to the position shown in FIG. 1.

A blind axial passage 56 extends from the right end of the power piston 47, and a valve seat 57 is disposed in the axial passage 56 for movement with the control spool 47. A poppet 58 is slidably disposed in the axial passage 56, and a light biasing spring 59 urges the poppet 58 to the right as viewed in FIG. 1 so that the engages the valve seat 57 when the brake booster 13 is deactuated to hydraulically isolate the power chamber port 25 and power chamber inlet passage 63 from the power chamber 51.

A connecting rod 64 is slidably disposed in an axial center bore in the poppet 58. Because there is no seal in the axial center bore in the poppet 58, the left end face of the connecting rod 64 is exposed to the fluid pressure of the power chamber 51 under all conditions. The right end of the connecting rod 64 slidably carries a poppet 65 which cooperates with the valve seat 41 for opening and closing fluid pressure communication between the power chamber 51 and the inlet of the pump 11 through the drain port 28. A spring 66 extends between the poppets 58 and 65.

The structural details of the poppet 65 are shown in FIG. 2. A seal 67 on a reduced diameter end of the connecting rod 64 prevents fluid leakage between the connecting rod 64 and the poppet 65. A retaining ring 68 is mechanically secured to the poppet 65 for movement therewith to retain the poppet 65 on the right end of the connecting rod 64 while permitting relative movement between the connecting rod 64 and poppet 65.

As described below, the valve seat 41 and poppet 65 provide a first valve means for opening and closing fluid pressure communication between the power chamber 51 and the inlet or drain side of the pump 11, and the valve seat 57 and poppet 58 provide a second valve means for opening and closing fluid pressure communication between the power chamber 51 and the outlet or pressure side of the pump 11. The spring 66 prevents relative movement between the poppet 65 and the poppet 58 under normal operating pressures in the power chamber 51, and the spring 66 permits relative movement between the poppets 65 and 58 in the event the pressure level in the power chamber 51 exceeds the predetermined shut-off pressure.

A control spool 69 is slidably disposed in a bore 70 in the housing 20 and is spring-biased to the left from the position shown in FIG. 1 by a coil spring 71. Annular grooves 72 and 73 define a throttling land 74 on the control spool 69, and the land 74 throttles fluid flow from the pump 11 to the steering valve 14 and maintains the outlet pressure of the pump 11 at at least a predetermined pressure differential above the working pressure of the brake booster fluid power chamber 51 in a manner described below. A stop member 75 is also disposed in the bore 70 to limit movement of the control spool 69 to the right as viewed in FIG. 1.

A passage 76 extends through the control spool 69 and communicates the pressure in the inlet port 26 (which is the same as the outlet pressure of the pump 11) to the left end face of the control spool 69. A passage 77 in the housing 20 establishes fluid pressure communication between the power chamber 51 and the right end face of the control spool 69 (which in the preferred embodiment is of equal lateral cross-sectional area to the left end face of the control spool 69). In this manner, the control spool 69 is urged to the left by the spring 71 and by the pressure in the fluid power chamber 51 to close communication between the ports 26 and 27, and the control spool 69 is urged to the right by the outlet pressure of the pump 11 to open communication between the ports 26 and 27. When these opposed forces are equal, the control spool 69 is in a balanced condition and remains stationary. When these opposed forces are unequal, the control spool 69 is in an unbalanced condition and moves to the right or left in the bore 70.

B. Operation 1. steering valve and brake booster deactuated

Turning now to the operation of the circuit shown in FIG. 1, the various components of the circuit are shown with the steering valve 14 in its neutral or center position and with the brake booster 13 deactuated. With the components in this position, the entire output of the pump 11 flows through the line 12 and into the inlet port 26. When the pump 11 is initially started-up, the control spool 69 is held in the far left position by the spring 71 until the pump pressure acting through the passage 76 on the left end of the control spool 69 moves the control spool 69 to the right to the position shown in FIG. 1. The fluid from the pump 11 then flows from the inlet port 26, past the left edge of the throttling land 74, and out the first outlet port 27 to the steering valve 14. The fluid then flows through the open center steering valve 14 and through the drain line 16 back to the inlet of the pump 11.

Under these conditions, the control spool 69 maintains the outlet pressure of the pump 11 at a predetermined pressure differential above the drain line pressure in the power chamber 51. The force urging the control spool 69 to the right is the force created by the pump pressure acting on the left end of the control spool 69, and the force urging the control spool 69 to the left is the sum of the force of the spring 71 and the force of the drain line pressure in the power chamber 51 acting on the right end of the control spool 69. Because the left and right ends of the control spool 69 are of equal areas, the pump pressure must exceed the power chamber pressure for the spool 69 to remain in the position shown in FIG. 1 due to the force of the spring 71. If the pump pressure does not exceed the pressure in the power chamber 51, the control spool 69 is moved to the left by the spring 71 so that the left edge of the throttling land 74 further restricts the flow of fluid from the inlet port 26 to the steering valve 14 to increase the pump pressure. If the pump pressure exceeds the pressure in the fluid power chamber 51 by more than the effective pressure of the spring 71, the control spool 69 is moved to the right so that the left edge of the throttling land 74 decreases the restriction of fluid flow to the steering valve 14 to decrease the pump pressure. When the power chamber 51 is connected to the drain line 17 (which is at zero gauge pressure in the preferred embodiment), the left edge of the throttling land 74 restricts the flow of fluid from the pump 11 to the steering valve 14 enough that the outlet pressure of the pump 11 equals the effective pressure of the spring 71. In the preferred embodiment, the spring 71 is selected to maintain the outlet pressure of the pump 11 at 50 p.s.i. when the steering valve 14 is in its neutral position and the brake booster 13 is deactuated.

2. steering valve actuation and subsequent brake booster actuation

When the brake booster is in its deactuated position shown in FIG. 1 and the steering valve 14 is moved from its center position to restrict the flow of fluid from the line 15 to the drain line 16, the output pressure of the constant displacement pump 11 increases to overcome this restriction. This increased pump pressure is transmitted through the passage 76 and acts on the left end of the control spool 69 to move the control spool 69 further to the right from the position shown in FIG. 1. This moves the left edge of the throttling land 74 further to the right to further open the passage from the inlet port 26 to the first outlet port 27 to minimize pressure loss from the pump 11 to the steering valve 14. Under these conditions, the control spool 69 may move all the way to the right in the bore 70 until it engages the stop member 75. When this occurs, the right end of the throttling land 74 will move to the right to a position between the inlet port 26 and the power chamber port 25. However, because of the small clearance between the outer periphery of the control spool 69 and the inner surface of the bore 70, a leakage path is maintained between the inlet port 26 and the power chamber port 25 and the inlet passage 63 so that fluid is still supplied to the brake booster.

When the steering valve 14 is actuated in this manner so that the outlet pressure of the pump 11 is increased, the brake booster 13 can be actuated. When the vehicle operator moves the input rod 31 to the left as viewed in FIG. 1 by applying a force to the brake pedal (not shown), the valve seat 41 engages the poppet 65. This hydraulically isolates the power chamber 51 from the outlet passage 39 and from the inlet or drain side of the pump 11. Further movement of the input rod 31 to the left moves the poppet 65 and the connecting rod 64 and the poppet 58 against the force of the light spring 59 to the left until the poppet 58 moves away from the valve seat 57. This is because the spring 66 has a relatively high preload to prevent relative movement between the poppets 65 and 58 under normal operating conditions so that the poppets 65 and 58 move together under normal operating conditions.

This establishes throttled fluid pressure communication between the high pump pressure in the inlet passage 63 and the fluid power chamber 51. This pressure which is admitted to the fluid power chamber 51 acts against the power piston 47 and begins to move the power piston 47 to the left as viewed in FIG. 1. This increased pressure in the power chamber 51 also acts on the input rod 31 to provide a reaction force which the vehicle operator can feel through the connecting rod 32 and the brake pedal.

If the input force on the input rod 31 applied by the operator of the vehicle remains constant, the increased pressure in power chamber 51 pushes the power piston 47 to the left while the input rod 31 remains stationary. The spring 59 retains the poppet 65 against the valve seat 41, so that the poppet 65 and the poppet 58 which is mechanically connected to the poppet 65 by the connecting rod 64 remain stationary while the power piston 47 moves to the left until the valve seat 57 engages the poppet 58. When this occurs, the fluid pressure in the power chamber 51 remains constant so that the braking effort applied through the output rod 50 on the master cylinder 22 remains constant.

If the vehicle operator applies an input force of increasing magnitude on the input rod 31, the input rod 31 will continue to move to the left with the power piston 47 to retain the poppet 58 away from the valve seat 57 until the desired amount of braking has been achieved. When the input force on the input rod 31 is released, the force of the fluid pressure in the chamber 51 moves the input rod 31 back to the right to separate the valve seat 41 from the poppet 65. This throttles the fluid in the power chamber 51 through the passages 39 and 40 to the outlet port 28 to release the force applied to the master cylinder 22 by the output rod 50.

If, under these conditions of steering valve actuation and subsequent brake booster actuation, the brake booster requires a pressure greater than the pressure required by the steering valve 14, the control spool 69 increases the pump pressure to a pressure level above the working pressure of the brake booster in the power chamber 51 so that adequate pump pressure is always available for the brake booster 13. To accomplish this, the working pressure of the brake booster in the power chamber 51 acts on the right end of the control spool 69. When this pressure plus the effective pressure of the spring 71 exceed the force of the pump pressure acting to the right on the control spool 69, the control spool 69 moves to the left until the left side of the valving land 74 restricts the flow of fluid from the inlet port 26 to the steering valve 14 sufficiently to increase the outlet pressure of the pump 12. The output pressure of the pump 11 increases until the pump pressure acting to the right on the control spool 69 equals the working pressure of the brake booster 13 plus the effective pressure of the spring 71 acting to the left on the control spool 69. In this manner, the control spool 69 maintains the outlet pressure of the pump 11 at least a predetermined pressure differential (the amount of such predetermined pressure differential is equal to the effective pressure of the spring 71) above the working pressure in the brake booster 51.

After the brake booster 13 has been deactuated and the steering valve 14 is deactuated, the outlet pressure of the pump 11 decreases to the 50 p.s.i. minimum pressure level maintained by the control spool 69 in the manner described above.

3. brake booster actuation and subsequent steering valve actuation

If the steering valve 14 is in the neutral position and the brake booster 13 is actuated, the control spool 69 maintains the outlet pressure of the pump 11 the aforementioned predetermined pressure differential above the working pressure of the brake booster in the power chamber 51. As soon as the brake booster is actuated in the manner described above so that the fluid pressure from the power chamber inlet passage 63 is throttled past the poppet 58 and valve seat 57 into the power chamber 51, such increased pressure in the power chamber 51 acts on the control spool 69 and moves the control spool 69 further to the left as viewed in FIG. 1. This causes the left side of the throttling land 74 to impose a further restriction on the flow of fluid from the pump 11 to the steering valve 14 so that the pressure in the pump 11 increases to get past this restriction. This action of the control spool 69 continues for all pressures in the power chamber 51.

If at any time during such actuation of the brake booster 13 the steering valve 14 is actuated, sufficient flow capacity from the pump 11 is always available to the steering valve 14. This is because the poppet 58 is dimensioned so that it can only move away from the valve seat 57 a small amount even when it is pushed to the left by the input rod 31 until the input rod 31 engages the power piston 47 under emergency stopping conditions. This provides a restrictive orifice under all conditions to limit the flow rate of fluid to the fluid power chamber 51 to insure adequate flow capacity for the steering valve 14.

4. brake booster at shut-off pressure

As described in detail above with particular reference to the structure of the pump 11, the pump 11 includes an internal relief valve which connects the outlet of the pump to the inlet of the pump when the outlet of the pump reaches 1200 p.s.i. The brake booster 13 shown in FIG. 1 provides a shut-off means which hydraulically isolates the pump outlet from the brake booster power chamber at a pressure of 1150 p.s.i. in the power chamber 51. This assures that the brake booster 13 can never, even under emergency stopping conditions, cause the pump 11 to reach its internal relief pressure of 1200 p.s.i. which would cause the output flow rate of the pump 11 to decrease to zero so that there would be no flow for operation of the steering valve 14. Because the shut-off means prevents further flow of fluid from the pump outlet to the brake booster power chamber at the shut-off pressure, the entire output flow of the pump is directed to the steering valve 14. The shut-off means also modulates to make up any leakage from the power chamber 51 at the shut-off pressure.

In the embodiment shown in FIG. 1, this is accomplished by the connecting rod 64, spring 66, and poppet 58. Under emergency stopping conditions of maximum braking effort, the left end face of the input rod 31 engages the right end face of the power piston 47. As described above, the poppet 58 is dimensioned so that it is moved away from the valve seat 57 a small amount when this occurs to allow fluid flow from the inlet passage 63 to the power chamber 51.

When the pressure in the power chamber 51 reaches 1150 p.s.i., the connecting rod 64 moves the poppet 58 to the right relative to the poppet 65 against the bias of the spring 66 to close the poppet 58 against the valve seat 57. This is because the left end face of the connecting rod 64 is exposed to the pressure in the power chamber 51 while the right end face of the connecting rod 64 is exposed to the drain line or pump inlet pressure which is zero gauge pressure in the preferred embodiment. The preload of the spring 66 is arranged so that the 1150 p.s.i. shut-off pressure in the power chamber 51 acting against the left end of the connecting rod 64 overcomes the preload of the spring 66 to move the connecting rod 64 to the right. Because the right end of the connecting rod 64 is slidably disposed in the poppet 65, this rightward movement of the connecting rod 64 does not move the poppet 65. However, due to the washer on the left end of the connecting rod 64, this rightward movement of the connecting rod 64 pulls the poppet 58 to the right to close the poppet 58 against the valve seat 57.

In the event of any leakage of fluid from the power chamber 51, the pressure in the power chamber 51 will begin to fall below 1150 p.s.i. When this occurs, the force of the pressure in the power chamber 51 acting against the left end face of the connecting rod 64 is less than the force of the spring 66 so that the spring 66 pushes the poppet 58 and connecting rod 64 to the left to slightly separate the poppet 58 from the valve seat 57 and modulate fluid flow from the power chamber inlet passage 63 to the power chamber 51. This provides make up flow to the power chamber 51 in the event of leakage so that the fluid pressure in the power chamber 51 is maintained at its 1150 p.s.i. maximum shut-off pressure under these conditions.

Although a preferred embodiment of the invention has been disclosed and described in detail, various modifications and rearrangements may be made. For example, the arrangement of the pump 11, control spool 69 and steering valve 14 shown in FIG. 1 are similar to that disclosed in the first embodiment shown in the above referenced U.S. Pat. application Ser. No. 379,319 filed July 16, 1973. The shut-off means according to the present invention could also be used with the accumulator circuit shown in the second embodiment of the referenced U.S. Pat. application Ser. No. 379,319 filed July 16, 1973 or could be used in a circuit having an accumulator as disclosed in the above referenced U.S. Pat. application Ser. No. 419,999, filed Nov. 29, 1973.

What is claimed is:

1. A motor vehicle fluid power circuit comprising a pump, a steering valve, and a brake booster, said pump having an inlet and an outlet and a relief valve hydraulically connecting said inlet to said outlet at a predetermined relief pressure, said brake booster having a power chamber, means hydraulically connecting said pump outlet and inlet to said steering valve and further means hydraulically connecting said pump outlet and inlet to said power chamber, said further means including an inlet passage in said brake booster hydraulically connecting said pump outlet to said power chamber and an outlet passage in said brake booster hydraulically connecting said pump inlet to said power chamber, a first valve surface in said brake booster movable in said outlet passage relative to said power piston between an open position and a closed position for opening and closing said outlet passage, a second valve surface in said brake booster movable in said inlet passage relative to said power piston between an open position and a closed position for opening and closing said inlet passage, shut-off means for moving said second valve surface relative to said power piston from said open position to said closed position to close said inlet passage and completely block said inlet passage to hydraulically isolate said pump outlet from said power chamber in response to the fluid pressure in said power chamber reaching a predetermined shut-off pressure, said shut-off means including a member movable relative to said first valve surface and having a fluid pressure surface exposed to fluid pressure in said power chamber and means communicating said fluid pressure in said power chamber with said fluid pressure surface, said member being operatively connected to said second valve surface to move said second valve surface relative to said power piston to said closed position when said fluid pressure in said power chamber reaches said shut-off pressure, said first valve surface being in said closed position to close said outlet passage and completely block said outlet passage to hydraulically isolate said fluid power chamber from said pump inlet when said member fluid pressure surface operates to close said second valve surface in response to said shut-off pressure, whereby said first and second valve surfaces prevent fluid flow through said power chamber from said inlet passage to said outlet passage when said shut-off pressure is reached, and said shut-off pressure being less than said relief pressure of said pump relief valve.

2. A motor vehicle fluid power circuit as defined in claim 1 wherein said brake booster includes input rod means, said input rod means being movable between a deactuated position and an actuated position, said first valve surface being movable by said input rod means between said open position and said closed position for opening and closing fluid pressure communication through said outlet passage between said fluid power chamber and said pump inlet, said second valve surface being movable by said input rod between said open position and said closed position and being axially spaced from said first valve surface for opening and closing fluid pressure communication through said inlet passage between said fluid power chamber and said pump outlet.

3. A motor vehicle fluid power circuit as defined in claim 2 wherein said member is part of a connecting means mechanically connecting said first and second valve surfaces.

4. A motor vehicle fluid power circuit as defined in claim 3 wherein said connecting means further includes spring means biasing said first valve surface and said second valve surface apart, and said second valve surface moves against the force of said spring means relative to said first valve surface to close said second valve surface in response to said power chamber pressure acting against said member fluid pressure surface reaching said shut-off pressure.

5. A motor vehicle fluid power circuit as defined in claim 4 wherein said member includes a connecting rod mechanically connecting said first and second valve surfaces, said member fluid pressure surface is a first lateral cross-sectional area of said connecting rod exposed to the pressure in said fluid power chamber, said shut-off means further including another fluid pressure surface exposed to the fluid pressure in said pump inlet, and said other pressure surface is a second lateral cross-sectional area of said connecting rod exposed to the pressure in said pump inlet.

6. A motor vehicle fluid power circuit as defined in claim 5 wherein said first valve surface is slidably connected to said connecting rod whereby said second valve surface and said connecting rod move relative to said first valve surface to close said second valve surface in response to said power chamber pressure reaching said shut-off pressure.

7. A motor vehicle fluid power circuit comprising a pump, a steering valve, and a brake booster, said pump having an inlet and an outlet and a relief valve hydraulically connecting said inlet to said outlet at a predetermined relief pressure, said brake booster having a power chamber, means hydraulically connecting said pump outlet to said steering valve and further means hydraulically connecting said pump outlet to said power chamber, valve means in said further means movable between an open position establishing fluid pressure communication between said pump outlet and said power chamber and a closed position hydraulically isolating said pump outlet from said power chamber, and rod means slidably disposed in said power chamber, said rod means having a first lateral cross-sectional area exposed to the pressure in said power chamber and a second lateral cross-sectional area exposed to the pressure in said pump inlet, said rod means being mechanically connected to said valve means in said further means, said rod means being responsive to a predetermined shut-off pressure in said power chamber acting against said first lateral cross-sectional area to move said valve means from said open position to said closed position to prevent the pressure in said power chamber from exceeding said predetermined shut-off pressure, and said shut-off pressure being less than said relief pressure of said pump relief valve.

8. A motor vehicle fluid power circuit as defined in claim 7 wherein said first mentioned valve means is an inlet valve means and said brake booster further includes outlet valve means and an actuating rod, said actuating rod being movable between a deactuated position and an actuated position, said outlet valve means being movable in response to said movement of said actuating rod to open and close fluid pressure communication between said fluid power chamber and said pump inlet, said inlet valve means being axially spaced from said outlet valve means and being movable in response to said movement of said actuating rod to open and close fluid pressure communication between said fluid power chamber and said pump outlet, said inlet valve means and said outlet valve means each including a poppet and a valve seat, and said rod means mechanically connecting said poppet of said inlet valve means with said poppet of said outlet valve means.

9. A motor vehicle fluid power circuit as defined in claim 8 including a spring preventing relative movement of said poppets when the fluid pressure in said power chamber is less than said predetermined shut-off pressure, and said rod means moves said poppet of said inlet valve means relative to said poppet of said outlet valve means from said open position to said closed position in response to said predetermined shut-off pressure acting against said first lateral cross-sectional area.

10. In a motor vehicle fluid power circuit, a brake booster comprising an inlet passage, an outlet passage, a power piston slidably disposed in a bore, a power chamber on one side of said power piston in said bore, outlet valve means for opening and closing fluid pressure communication between said outlet passage and said power chamber, inlet valve means for opening and closing fluid pressure communication between said power chamber and said inlet passage, and rod means slidably disposed in said power chamber, said rod means having a first lateral cross-sectional area exposed to the pressure in said power chamber and a second lateral cross-sectional area exposed to the pressure in said outlet, said rod means being mechanically connected to said inlet valve, said rod means being responsive to a predetermined shut-off pressure in said power chamber acting against said first lateral cross-sectional area to close said inlet valve to prevent the pressure in said power chamber from exceeding said predetermined shut-off pressure.

* * * * *